Dec. 23, 1941.    J. H. VAN UUM    2,267,511
SPRING FASTENER GUARD AND SEALING DEVICE
Filed Feb. 11, 1941

INVENTOR.
JOHN H VAN UUM
BY
HIS    ATTORNEY

Patented Dec. 23, 1941

2,267,511

UNITED STATES PATENT OFFICE 2,267,511

SPRING FASTENER GUARD AND SEALING DEVICE

John H. Van Uum, Lakewood, Ohio

Application February 11, 1941, Serial No. 378,404

10 Claims. (Cl. 24—73)

This invention relates to spring fasteners of the type employed to secure to an apertured support, adjacent or over an aperture thereof, members such as metal trim strips.

When members such as metal trim strips are secured to sheet metal structures such as automobile fenders by spring fasteners of the type or class shown herein, the so-called shank portions of the fasteners, which portions engage or interlock with the sheet metal fender, are often exposed at the inner surfaces of the fenders. In such exposed position, the fasteners frequently become displaced or broken during cleaning operations performed on the fenders. Moreover, since the shank portions of the fasteners do not fill or seal the apertures in the sheet metal through which they extend, any apertures which are exposed to road splash and water permit entry of the road splash, water, and foreign matter contained therein which thereby come into contact with the interior of the trim, and the fasteners themselves. This subsequently leaks out onto the outer surface of the fender or support, causing discoloration and streaks. If the road splash contains chemicals such as calcium chloride and the like, the problems of excessive rusting of the fastener and of the support, and deterioration of the trim, become pronounced and the resultant discoloration of the fenders and the like is increased.

One object is to provide for guarding the attaching shanks of spring fasteners against becoming displaced or damaged under conditions such as mentioned above.

Another object is to provide a combined fastener and guard device which will prevent or reduce likelihood of soiling of the surface of the main structure on which the fastener is used.

A further object is to provide in an assembly comprising a spring fastener and apertured support through the aperture of which a shank portion of the fastener extends to hold a member on the support, a fastener and means cooperating with the fastener to seal the aperture against passage of water, dust, etc., therethrough.

Another object is to provide in combination with a spring wire fastener having a contractible and expansible attaching shank adapted to pass through an aperture in a support and to hold a member such as a trim strip firmly in association with the support while occupying only a portion of the aperture, means which will operate effectively to close the unoccupied portion of the aperture while tending to assist in maintaining the fastener in snug fastening relation to such member and support.

Other objects of the invention will become apparent from the following description of a preferred embodiment thereof shown in the drawing, in which—

Figure 1:
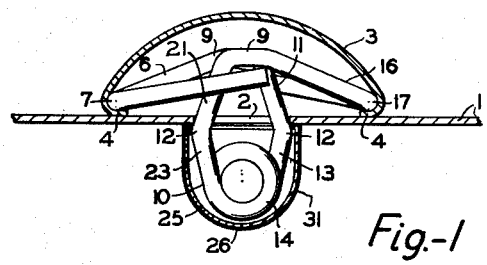
Fig. 1 is a sectional view showing an exemplary trim member, fastener, and a sealing and guarding device in the form of a cap, all secured to an apertured metal panel.

Referring to the drawing, a portion of an apertured support 1, such as a sheet metal automobile fender, and having an aperture 2 for attachment of trim strips to the support is illustrated, the support 1 being provided with a series of such apertures along a line determined by the desired position for a trim strip. Usually the apertures are circular and the trim strip may take various forms. In Fig. 1 a common type of trim strip 3 is illustrated and has a central body of flattened arch shape and inturned marginal flanges 4. Various types of spring fasteners are known having attachment portions or heads for engagement with the flanges and adjacent portions of such trim strips and having shanks adapted to pass through apertures in a support and to bear against the walls defining the apertures in a manner to retain the trim strips firmly in place.

The fastener herein shown is made of one piece of spring wire and has a head formed by arm portions 6 and 16 adapted to lie within the arch shaped body of the strip and parallel portions 7 and 17 on the arms adapted to overlie respective flanges 4 and forcibly to press outwardly in opposite directions parallel to the plane of the flanges against the body material of the strip adjacent the flanges. For a more complete illustration of a spring fastener operatively similar to the one shown herein, reference is directed to U. S. Patent 2,221,009, issued to me on November 12, 1940, particularly Figs. 5 and 6 of said patent. The heads or means for attaching such members as trim strips to the fasteners can of course be variously shaped.

Extending from the head in a direction toward the main supporting structure 1 is a securing shank 10. The shank is in the form of a closed loop of the spring wire stock which, beginning with relatively crossed portions 9 of the wire stock, centrally of the head, extends toward and through the aperture 2. Extending from the crossed portions of the loops are diverging leg portions 11 and 21 which are contiguous with the arms 6 and 16, respectively. The loop beyond the diverging portions, and, beginning with shoulders 12 which constitute the widest portion of the loop, is in the form of converging leg portions 13 and 23 which act as guides for guiding the shank into aperture 2. In order to increase the flexibility or resiliency of the shank in the principal plane of the loop while maintaining as short a shank as possible, the end of the shank is in the form of a coil 14 of the wire stock.

The oppositely disposed surfaces of the diverging portions 11 and 21 being relatively contractible and expansible, the locking shoulders 12 can pass through the aperture 2 and then engage with the walls defining the aperture for securing the fastener and trim member 3 attached to the head of the fastener to the support. In this position the shoulders 12 are positioned a substantial distance beyond the inner face of the support in a direction away from the head or attaching portion of the fastener. Thus the converging portions 13 and 23 of the shank, in order to function properly as a guiding means for inserting the fastener, necessarily extend a considerably greater distance away from the support.

As noted above, the head portion of the fastener constituted in part by the arm 6 is contiguous with the leg portions 11 and 13 of the shank, whereas the head portion constituted in part by the arm 16 is contiguous with the leg portions 21 and 23 of the shank. By this arrangement contraction of the shank or movement of the locking shoulders 12 toward each other, as would be necessary in order for the shank to become detached from the support 1, is opposed not only by the spring strength of the wire, but also by the abutment of the head portions 7 and 17 with respective non-yielding portions of the trim strip. Trim strips secured as described above are therefore very securely fastened to the support, and the distance which the locking shoulders 12 originally extend beyond the support is thereby maintained.

It will be seen from the above that the aperture 2, regardless of its shape, cannot be completely closed by the spring wire of the shank of the fastener.

The means whereby the aperture 2 is sealed and the shank of the fastener enclosed and guarded according to the present invention preferably constitutes an imperforate cap device 25.

Figure 2:
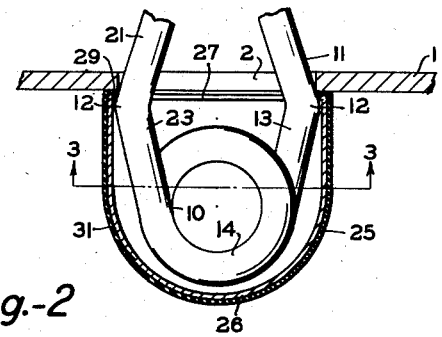
Fig. 2 is an enlarged fragmentary sectional view showing the shank portion of the fastener and the sealing and guarding device in place thereon, and the combination installed in a support.

The cap 25 preferably comprises a hollow, light sheet metal body closed at one end 26 and having an opening 27 at the other end to permit insertion of the shank of the fastener into the cap. The cap is of metal of sufficient strength, depending on the forces to which it is subjected by the shank. Steel stock 30 thousandths of an inch in thickness is usually satisfactory. The side wall and end portion 26 are imperforate. The opening 27 of the cap is made slightly larger in size than the opening 2 in the supporting structure. The opening 27 is defined by free edge portions 28 of an annular flange 29 of the sheet metal body. The flange overhangs the interior of the cap a sufficient distance so that with the cap in assembled relation to the fastener shank as shown in Figs. 1 and 2, the edge 28 of the flange engages the fastener shank beyond the shoulders 12 in a direction away from the coil 14. Thus the resiliency of the leg portions of the shank of the fastener and also the resiliency of the wall portions of the cap cooperate to retain the cap in place on the fastener shank. The cap 25, in its working position illustrated in Figs. 1 and 2, not only guards all portions of the shank of the fastener which would otherwise be exposed on the side of the supporting structure opposite the head and trim, but also seals the opening 2 against entrance of foreign matter, such as water and dirt, into the hollow interior of the trim strip.

Figure 4:
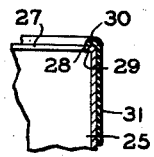
Fig. 4 is a detail view showing a portion of the cap disassociated from the fastener.

The effective closing of the opening 2 is augmented by providing resilient sealing material 30 on the outer side of the flange 29, as best illustrated in Fig. 4. Preferably, the sealing material is a thickened part of an exterior coating 31 of rubber latex which may be caused to adhere tightly to the exterior of the cap by dipping the cap and flange into liquid latex and allowing the coating to dry on the cap surface. The interior of the cap and free edge of the flange can be prevented from becoming coated with the latex, if desired, by mounting the caps on dipping studs which seal against the edges 28 of the flanges 29.

Figure 3:
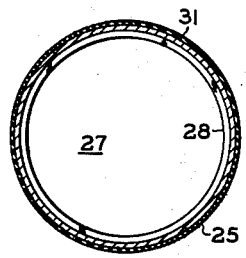
Fig. 3 is a transverse sectional view of the sealing and guarding cap taken along the line 3—3 on Fig. 2.
Figure 5:
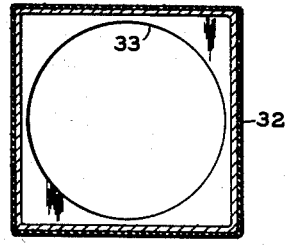
Fig. 5 is a view similar to Fig. 3 showing a sealing and guarding cap of a different form.

The cap in transverse cross section may be other than circular, for instance, square as shown at 32, Fig. 5. In this figure, in order to provide an opening 33 corresponding to the opening 27 of Figs. 2 and 3, the flange is simply extended at the corner portions of the cap.

In attaching the cap to the fastener shank, the cap is simply sprung over the shoulders 12 after the fastener is in its operating position. This ordinarily does not cause contraction of the shank since the walls of the cap are sufficiently yieldable to permit the slight elongation in cross-section of the cap necessary to permit movement of the cap onto the shank to dispose the flange of the cap into locking engagement with the diverging portions 11 and 21 of the fastener. Since the flange 29 is yieldably engaged with surfaces of the fastener which converge toward the support 1, it is drawn firmly toward the support 1 and the sealing material 30 is thereby compressed against the adjacent face of the support 1 continuously around the aperture 2 therein.

I claim:

1. The combination with a spring fastener having a head adapted to retain a member against a support adjacent an aperture in such support and having an expansible and contractible resilient shank with oppositely disposed portions which diverge in a direction away from the head for abutment with wall portions of such aperture for holding the fastener and attached member on the support, and continuous relatively converging oppositely disposed portions extending therebeyond in the same direction and adapted to guide the shank into the aperture, of a hollow cap arranged to encase portions of the shank which lie remotely of the head, said cap having an inturned annular flange adapted and arranged to abut the diverging portions of the shank beyond the support in said direction away from the head for retaining the cap in place on the shank.

2. The combination with a spring fastener having a head adapted to retain a member against a support adjacent an aperture in such support and having an expansible and contractible resilient shank with oppositely disposed portions which diverge in a direction away from the head for abutment with wall portions of such aperture for holding the fastener and attached member on the support, and contiguous relatively converging oppositely disposed portions extending therebeyond in the same direction and adapted to guide the shank into the aperture, of a hollow cap arranged to encase portions of the shank which lie remotely of the head, said cap having an imperforate body and an inturned annular flange of sufficient size so that the cap with the flange will close an aperture, the walls of which will hold the fastener shank therein, said flange being adapted and arranged to abut the diverging portions of the shank beyond the support in said direction away from the head for retaining the cap on the shank in closing relation to such aperture.

3. The combination with a one-piece snap fastener having an attachment portion for attachment to a member to be secured to a support, and having an expanding and contracting resilient shank in the form of a loop for reception through an aperture in such support, said loop having spaced portions which diverge in a direction away from the attachment portion for providing support-engaging shoulders, and said loop having spaced converging portions beyond the diverging portions in the same direction for guiding the shank into such aperture, of a protecting cap having a hollow body encasing the converging portions of the shank and having an inturned annular flange providing an opening into the hollow body of less width than the widest portion of the shank, said flange engaging the diverging portions of the loop for retaining the cap in place on the fastener.

4. The combination with a one-piece snap fastener having an attachment portion for attachment to a member to be secured to a support, and having an expanding and contracting resilient shank in the form of a loop for reception through an aperture of predetermined size in such support, said loop having spaced portions which diverge in a direction away from the attachment portion for providing support-engaging shoulders spaced apart a distance greater than the width of said aperture, and said loop having spaced converging portions beyond the diverging portions in the same direction for guiding the shank into such aperture, of a protecting cap having a hollow imperforate body encasing the converging portions of the shank and having an inturned annular flange providing an opening into the hollow body of less width than the widest portion of the shank, said flange engaging the diverging portions of the loop for retaining the cap in place on the fastener, the outer limits of the flange being larger than said aperture, whereby the cap and its flange can close said aperture when in the aforesaid position on the shank.

5. The combination with a spring fastener comprising a head adapted for attachment to a member to be held against a supporting plate and an expansible and contractible shank adapted to enter an aperture in such supporting plate and having diverging portions extending away from the head through the supporting plate for locking engagement with wall portions of the supporting plate defining said aperture, of a guard cap arranged to enclose such portions of the shank as extend beyond the supporting plate in a direction away from the head, said cap comprising a hollow, generally imperforate body of relatively rigid material having an inturned flange defining an opening leading into the interior of the cap, said opening being of such size relative to the diverging portions that the flange will abut the diverging portions while the latter extend beyond the flange toward the interior of the body to hold the cap on the fastener, and yieldable sealing material on the outer face of the flange for sealing contact with the supporting plate around the aperture thereof.

6. The arrangement defined by claim 5 wherein the sealing material constitutes an annular inward continuation of a rubber coating which covers the outside of the cap.

7. The combination with a spring fastener comprising a head adapted for attachment to a member to be held against a fixed support and an expansible and contractible shank adapted to enter an aperture of predetermined size in such support and having relatively diverging portions extending away from the head beyond the support for locking engagement with wall portions of the support defining said aperture, of a sealing device having a portion of substantially greater width than an aperture in which the relatively diverging portions of the fastener will operate as aforesaid, and a portion engaging the relatively diverging portions of the shank and operating to press the first mentioned portion against the fixed support in sealing relation to the aperture.

8. In combination with a one-piece wire spring fastener having relatively expansible and contractible head portions adapted to hold a hollow trim member against a sheet-like support, which support has an aperture therein, and an expansible and contractible shank in the form of a loop with diverging edge portions for locking engagement with opposite wall portions of such aperture and converging portions contiguous with the diverging portions for guiding the shank through such aperture, the diverging portions being connected respectively with the head portions which lie on the opposite side of the loop therefrom so that contraction of the shank effects relative expansion of the head portions, and a hollow guard cap constructed and arranged to enclose portions of the shank which extend beyond the support in a direction away from the head, said cap having an annular inturned flange adapted to abut the support so that the flange and cap can close such aperture, said flange terminating inwardly over the interior of the cap in position to abut the diverging portions of the loop in a manner to hold the cap in place while tending to assist in relatively expanding the head portions of the fastener.

9. The combination of a wire spring fastener comprising a head adapted for attachment to a member to be held against a fixed support and a shank in the form of a contractible loop of wire extending away from the head, which loop has portions which diverge in a direction away from the head and are adapted to abut side walls of an aperture in the support while extending through such aperture, the wire of the loop being coiled beyond the diverging portions remotely of the head to augment the contractibility of the loop without materially increasing the extent of the loop away from the head, and a guard cap surrounding the coiled portion of the loop and having an inturned flange in a plane which intercepts the diverging portions of the loop, which flange abuts the diverging portions to hold the cap in place on the fastener.

10. In a combination comprising a supporting plate having an aperture therein, and a spring fastener having a head adapted to secure a member against the plate over the aperture and an expansible and contractible shank extending away from the head through the aperture and expanded beyond the aperture for locking engagement with the plate; a cup-shaped cap having an imperforate wall surrounding the portion of the fastener which extends beyond the plate from the aperture, said cap having an inturned annular flange at the rim of the cup abutting the plate around the aperture so that the cap closes the aperture and having free edge portions in abutting relation to the expanded portion of the shank.

JOHN H. VAN UUM.